United States Patent
Chen et al.

(10) Patent No.: US 7,920,757 B2
(45) Date of Patent: Apr. 5, 2011

(54) METHOD FOR PROCESSING A MACRO BLOCK OF IMAGE DATA

(75) Inventors: Chien-Chih Chen, Hsinchu (TW); Yu-Ling Ko, Hsinchu (TW)

(73) Assignee: Silicon Integrated Systems Corp., Hsinchu Science Park, Hsin-Chu (TW)

( * ) Notice: Subject to any disclaimer, the term of this patent is extended or adjusted under 35 U.S.C. 154(b) by 890 days.

(21) Appl. No.: 11/845,757

(22) Filed: Aug. 27, 2007

(65) Prior Publication Data

US 2009/0060361 A1    Mar. 5, 2009

(51) Int. Cl.
*G06K 9/36*  (2006.01)
*G06K 9/46*  (2006.01)
*G06K 9/40*  (2006.01)

(52) U.S. Cl. .................. 382/275; 382/232; 382/254

(58) Field of Classification Search .......... 382/232, 382/275, 254
See application file for complete search history.

(56) References Cited

U.S. PATENT DOCUMENTS

| 2003/0058944 A1* | 3/2003 | MacInnis et al. | 375/240.13 |
| 2006/0110062 A1* | 5/2006 | Chiang et al. | 382/260 |
| 2006/0110065 A1* | 5/2006 | Huang et al. | 382/275 |

* cited by examiner

*Primary Examiner* — Bhavesh M Mehta
*Assistant Examiner* — Bernard Krasnic
(74) *Attorney, Agent, or Firm* — Winston Hsu; Scott Margo

(57) ABSTRACT

The image data are coded with field DCT or frame DCT depending on the characteristics of the image data. However different coding types will result in different boundary marks of boundaries between adjacent blocks or adjacent macro blocks. Therefore the de-blocking of a boundary between two adjacent blocks or adjacent macro blocks should be performed according to the format of image data and the coding type of the adjacent blocks or adjacent macro blocks.

7 Claims, 11 Drawing Sheets

| For horizontal boundary of adjacent blocks of a macro block | | | | |
|---|---|---|---|---|
| Image Data Format | | DCT Type (DCT type of upper block & DCT type of lower block) | | $Y_0/Y_1/Y_2/Y_3$ |
| Frame Picture | Progressive | Frame DCT & Frame DCT | | 4+4 (4,5,6,7,8,9,10,11) |
| | Interlaced | Field DCT & Field DCT | | Not the block effect boundary |
| | | Frame DCT & Frame DCT | even | 2+2 (4,6,8,10) |
| | | | odd | 2+2 (5,7,9,11) |
| | | Field DCT & Field DCT | | Not the block effect boundary |
| Field Picture | Interlaced | | even | 4+4 (8,10,12,14,16,18,20,22) |
| | | | odd | 4+4 (9,11,13,15,17,19,21,23) |

Fig. 10

| For horizontal boundary of macro blocks | | | | $Y_0/Y_1/Y_2/Y_3$ |
|---|---|---|---|---|
| Image Data Format | | DCT Type (DCT type of upper block & DCT type of lower block) | | |
| Frame Picture | Progressive | Frame DCT & Frame DCT | | 4+4 (12,13,14,15,16,17,18,19) |
| | Interlaced | 1.Field DCT & Field DCT 2.Frame DCT & Field DCT 3.Field DCT & Frame DCT | even | 2+2 (12,14,16,18) |
| | | | odd | 2+2 (13,15,17,19) |
| | Interlaced | Frame DCT & Frame DCT | even | 2+2 (12,14,16,18) |
| | | | odd | 2+2 (13,15,17,19) |
| | | 1.Field DCT & Field DCT 2.Frame DCT & Field DCT 3.Field DCT & Frame DCT | even | 2+2 (12,14,16,18) |
| | | | odd | 2+2 (13,15,17,19) |
| Field Picture | Interlaced | | even | 4+4 (24,26,28,30,32,34,36,38) |
| | | | odd | 4+4 (25,27,29,31,33,35,37,39) |

Fig. 11

METHOD FOR PROCESSING A MACRO BLOCK OF IMAGE DATA

BACKGROUND OF THE INVENTION

1. Field of the Invention

The present invention relates to a method for processing a macro block of image data, and more particularly, to a method for processing a macro block of image data and de-blocking a horizontal boundary of the macro block according to a format of the image data and a coding type of the macro block.

2. Description of the Prior Art

To efficiently compress a time variable video sequence, redundancy in the temporal domain as well as in the two dimensional spatial domain must be reduced. The Moving Picture Experts Group (MPEG) standards use a discrete cosine transform (DCT) to reduce the redundancy in the two dimensional spatial domain and a motion compensation method to reduce the redundancy in the temporal domain.

The DCT is a method of reducing the correlativity between data through a two dimensional spatial transformation. Each block in a picture is spatially transformed using the DCT after the picture is divided into blocks. Data that has been spatially transformed tends to be driven to a certain direction. Only a group of the data driven in the certain direction is quantized and transmitted.

Pictures, which are consecutive in the temporal domain, form motions of a human being or an object at the center of the frame. This property is used to reduce the redundancy of the temporal domain in the motion compensation method. A volume of data to be transmitted can be minimized by taking out a similar region from the preceding picture to fill a corresponding region, which has not been changed (or has very little change), in the present picture. The operation of finding the most similar blocks between pictures is called a motion estimation. The displacement representing a degree of motion is called a motion vector. MPEG uses a motion compensation-DCT method so that the two methods combine.

When a compression technique is combined with a DCT algorithm, the DCT transform is usually performed after input data is sampled in a unit size of 8×8, and the transform coefficients are quantized with respect to a visual property using quantization values from a quantization table. Then, the data is compressed through a run length coding (RLC). The data processed with the DCT is converted from a spatial domain to a frequency domain and compressed through the quantization with respect to the visual property of human beings, not to be visually recognized. For example, since the human eye is insensitive to high frequencies, a high frequency coefficient is quantized using a large step size. Thus, a quantization table is made according to external parameters, such as a display characteristic, watching distance, and noise, to perform an appropriate quantization.

For the quantized data, the data having a relatively high frequency is coded with a short code word. The quantized data having a low frequency is coded with a long code word. Thus, the data is finally compressed.

Please refer to FIG. 1. FIG. 1 shows a plurality of adjacent 8×8 pixel blocks 100, 102, 104 used according to the above described MPEG compression. In processing a moving picture as discussed above, these blocks 100, 102, 104 are individually processed to maximize the compression ratio and coding efficiency. However, this individual processing causes blocking artifacts that are noticeable at boundaries between blocks. Both horizontal block boundaries 106 and vertical block boundaries 108 are present and tend to cause square patterns (blocking artifacts) that are quite apparent to the human eye.

At low coding bit rates, blocking artifacts are a serious problem for moving picture compression. Since a real-time operation is necessary in coding and decoding a moving picture, it is difficult to reduce the blocking artifact with a small operation capacity. As such, existing video compression algorithms and standards continue to have unwanted visual artifacts appear when the original information is compressed with loss, and these unwanted visual artifacts become more visible when the coding bit rates become lower.

In the traditional block-based video compression standards such as MPEG-1 and MPEG-2, the blocking artifact is the most noticeable artifact. In actuality, there are two main sources of blocking artifacts. As mentioned previously, the major source comes from individually encoding each 8×8 DCT block without considering the correlation between adjacent blocks. In this case, coarse quantization of the transform coefficients causes discontinuities at the block boundaries. The second source of blocking artifacts is from the motion compensated prediction. Motion compensation involves coding pixel data from a reference frame and results in a discontinuity at the edge of the copied block. Additionally, any blocking artifacts existing in the reference frame may also be propagated to a current frame due to copying process. As such, the blocking artifacts resulting from motion compensated prediction can occur at any position inside an 8×8 predictive block.

SUMMARY OF THE INVENTION

The present invention provides a method for processing a macro block of image data comprising coding the macro block with frame discrete cosine transform (frame DCT) or field discrete cosine transform (field DCT); and de-blocking a horizontal boundary of adjacent blocks of the macro block according to a format of the image data and a coding type of the macro block.

The present invention further provides a method for processing adjacent macro blocks of image data comprising coding the adjacent macro blocks with frame discrete cosine transform (frame DCT) or field discrete cosine transform (field DCT); and de-blocking a horizontal boundary of the adjacent macro blocks according to a format of the image data and a coding type of the adjacent macro blocks.

The present invention further provides a method for processing adjacent macro blocks of image data comprising coding the adjacent macro blocks one with frame discrete cosine transform (frame DCT) and the other with field discrete cosine transform (field DCT); and de-blocking a horizontal boundary of the adjacent macro blocks according to a format of the image data and a coding type of the adjacent macro blocks.

The present invention further provides filter techniques which are generally based on one of two approaches: de-blocking with 4+4 pixels and de-blocking with 2+2 pixels. In the first category, the de-blocking of the horizontal boundary is performed with eight pixels per column closest to the horizontal boundary. The other category, the de-blocking of the horizontal boundary is performed with four odd pixels per column closest to the horizontal boundary and four even pixels per column closest to the horizontal boundary.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 10 is a table for de-blocking a horizontal boundary between two adjacent blocks of a macro block.

FIG. 11 is a table for de-blocking a horizontal boundary between two adjacent macro blocks.

DETAILED DESCRIPTION

Figure 1:
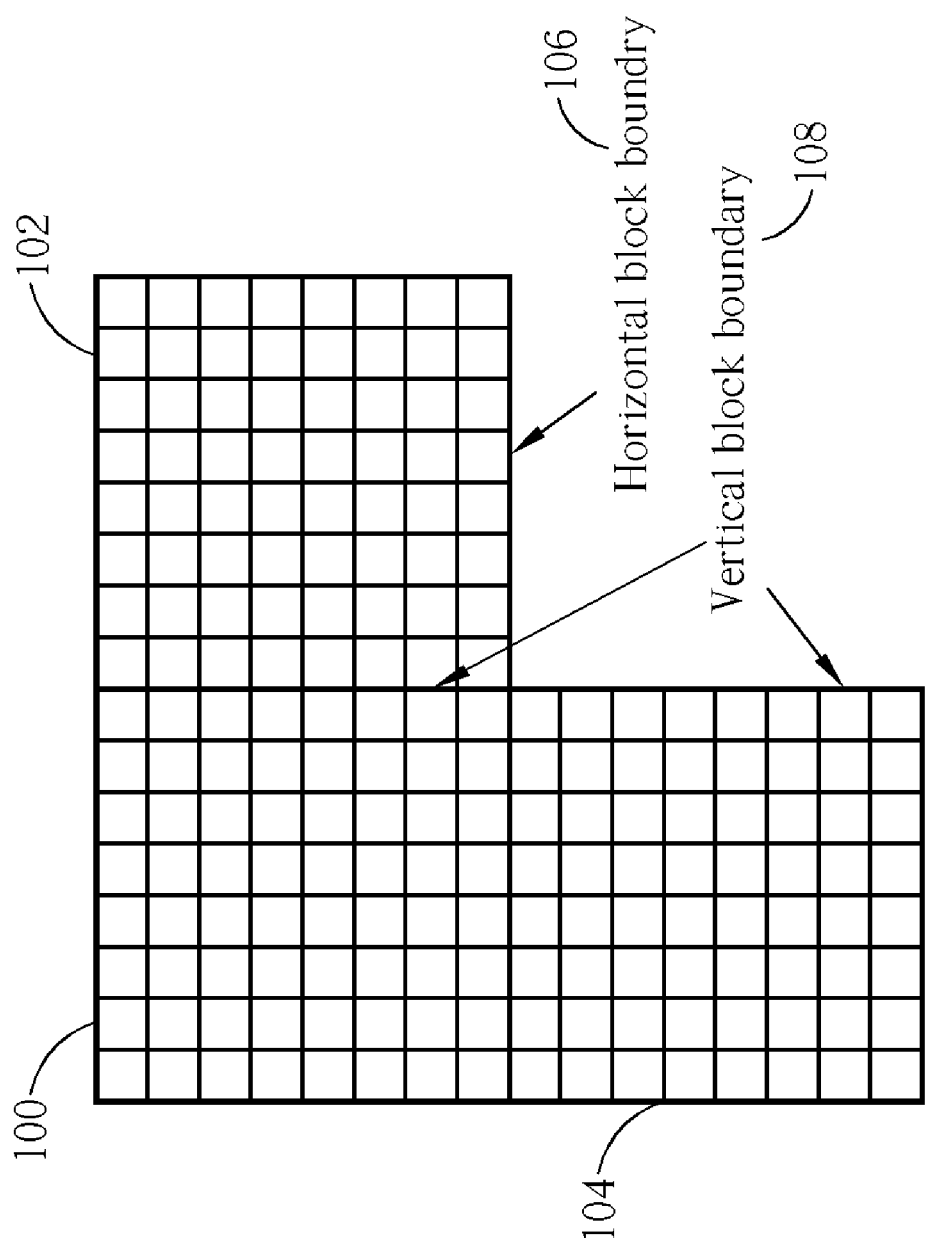
FIG. 1 shows a plurality of adjacent 8×8 pixel blocks used according to the above described MPEG compression.
Figure 2:
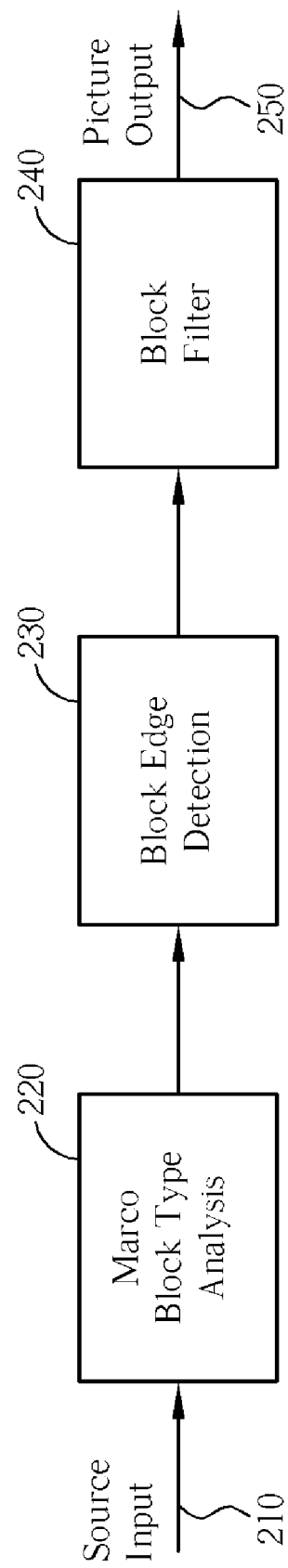
FIG. 2 is a flowchart of processing macro blocks of image data according to the present invention.

Please refer to FIG. 2. FIG. 2 is a flowchart of processing macro blocks of image data according to the present invention. In an MPEG-2 compression process, image data is first divided into 8×8 blocks of pixels, and then undergoes a discrete cosine transform (DCT) operation. The quantization of DCT coefficients will cause blocking artifacts. That is, the boundary of adjacent blocks will have a clear mark. The DCT operation is performed on a macro block which has four blocks. The DCT operation can be a frame DCT operation or a field DCT operation. The type of DCT operation to be performed on the image data is determined according to the characteristics of image data. Different types of DCT operation will cause different types of boundary marks between adjacent blocks. Thus the de-blocking method of the boundary between two adjacent blocks should be determined according to the type of DCT operated on the blocks, so as to optimize the de-blocked image quality. The processing of macro blocks of image data is as follows:

Step 210: input image data;

Step 220: analyze the DCT type operated on each macro block, the macro block might be coded with frame DCT or field DCT. A macro block coded with frame DCT will generate a mark at the horizontal boundary of two adjacent blocks. A macro block coded with field DCT will not generate a mark at the horizontal boundary of two adjacent blocks. Moreover, different macro blocks may be coded with different DCT type. Thus the mark generated at the horizontal boundary of two adjacent macro blocks may have four different types. The first type is generated when both of the two adjacent macro blocks are coded with frame DCT. The second type is generated when the upper macro block of the two adjacent macro blocks is coded with frame DCT, the lower macro block is coded with field DCT. The third type is generated when the upper macro block of the two adjacent macro blocks is coded with field DCT, the lower macro block is coded with frame DCT. The fourth type is generated when both of the two adjacent macro blocks are coded with field DCT;

Step 230: detect the boundary type of adjacent blocks according to the analysis result of step 220;

Step 240: de-blocking the boundary of adjacent blocks according to the boundary type detected in step 230;

Step 250: outputting the image data.

Figure 3:
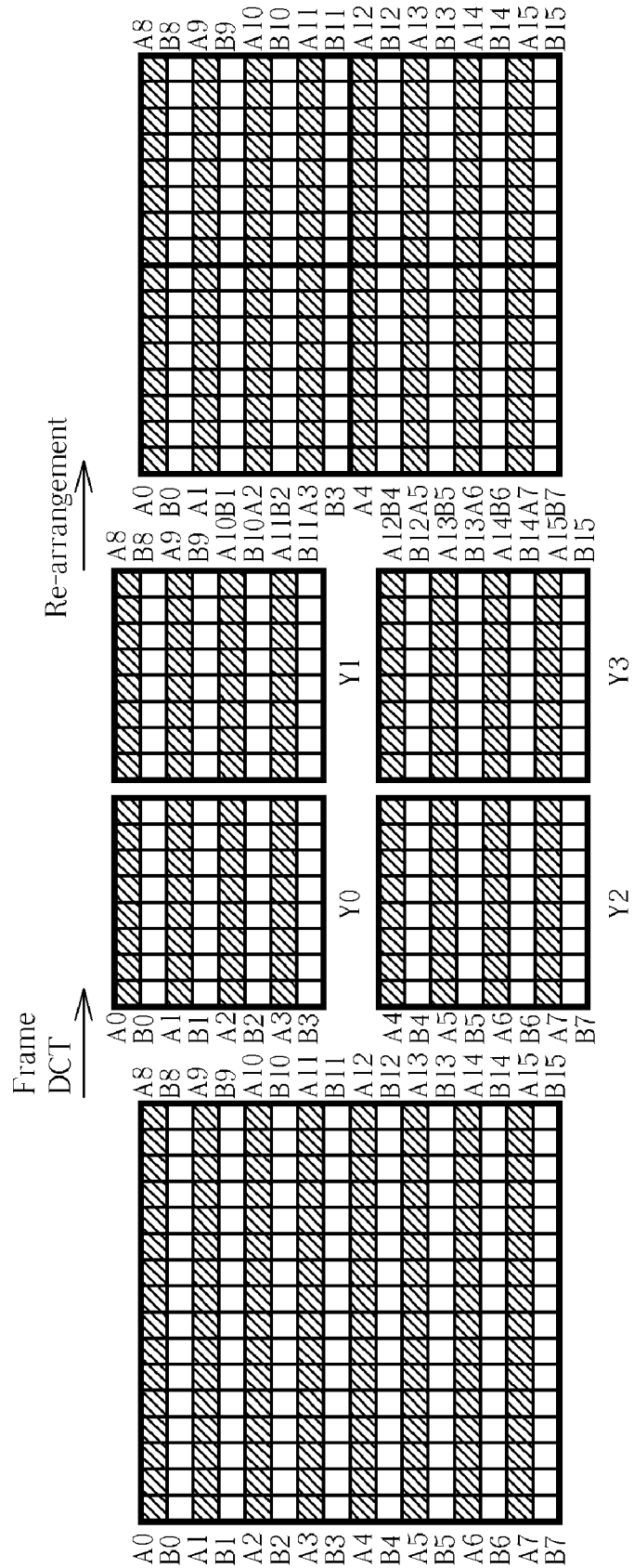
FIG. 3 is a perspective view of coding a macro block of image data with frame DCT.

Please refer to FIG. 3. FIG. 3 is a perspective view of coding a macro block of image data with frame DCT. In this embodiment, the format of the image data is of interlaced frame pictures. Even rows of the macro block has sections A0 to A15, odd rows of the macro block has sections B0 to B15. Each section has 8 pixels. Sections A0 to A7 and B0 to B7 are at the left side of the macro block. Sections A8 to A15 and B8 to B15 are at the right side of the macro block. After performing a frame DCT operation, the macro block is divided into four luminance blocks Y0 to Y3. Each of the luminance blocks has 8×8 pixels. The luminance block Y0 has sections A0 to A3 and B0 to B3. The luminance block Y1 has sections A8 to A11 and B8 to B11. The luminance block Y2 has sections A4 to A7 and B4 to B7. The luminance block Y3 has sections A12 to A15 and B12 to B15. After repositioning the luminance blocks Y0 to Y3, horizontal boundaries will be formed between section B3 and section A4, and between section B11 and section A12.

Figure 4:
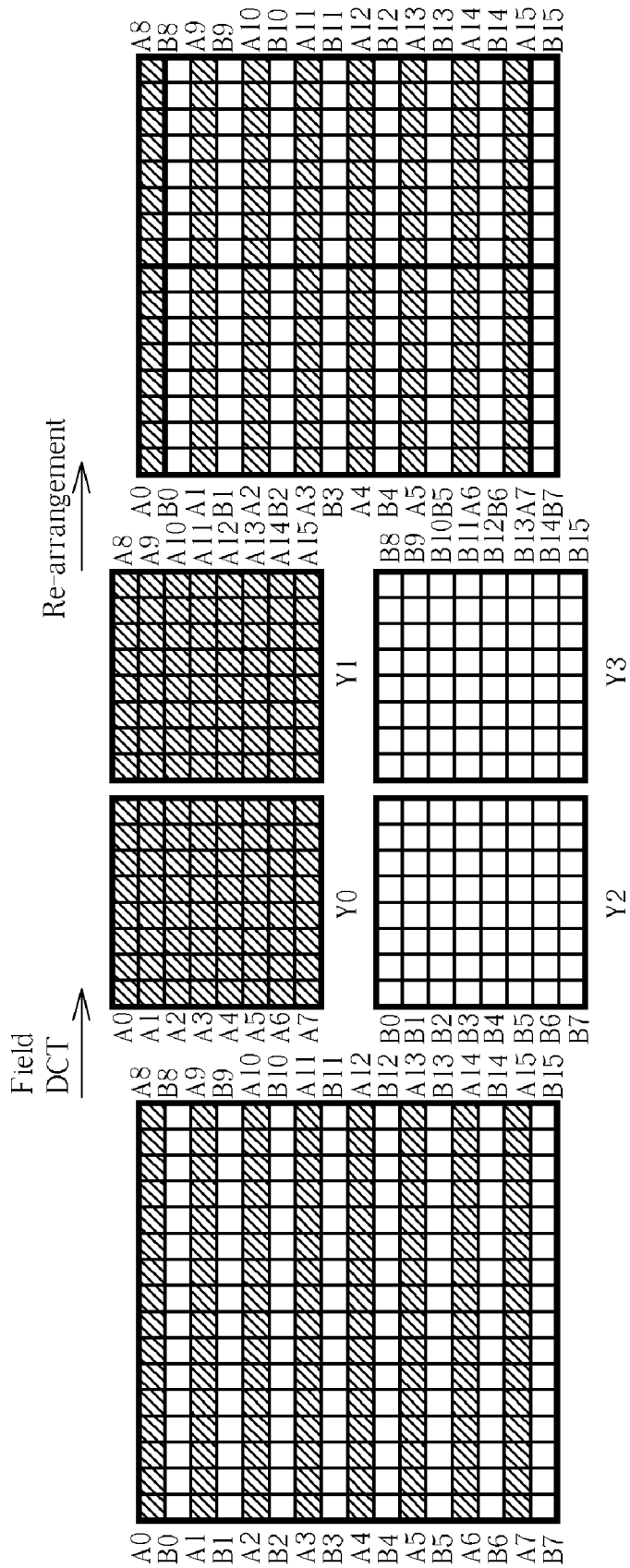
FIG. 4 is a perspective view of coding a macro block of image data with field DCT.

Please refer to FIG. 4. FIG. 4 is a perspective view of coding a macro block of image data with field DCT. In this embodiment, the format of the image data is of interlaced frame pictures. Even rows of the macro block has sections A0 to A15, odd rows of the macro block has sections B0 to B15. Each section has 8 pixels. Sections A0 to A7 and B0 to B7 are at the left side of the macro block. Sections A8 to A15 and B8 to B15 are at the right side of the macro block. After performing a field DCT operation, the macro block is divided into four luminance blocks Y0 to Y3. Each of the luminance blocks has 8×8 pixels. The luminance block Y0 has sections A0 to A7. The luminance block Y1 has sections A8 to A15. The luminance block Y2 has sections B0 to B7. The luminance block Y3 has sections B8 to B15. After repositioning the luminance blocks Y0 to Y3, horizontal boundaries will be formed between section A0 and section B0, between section A7 and section B7, between section A8 and section B8, and between section A15 and section B15.

Figure 5:
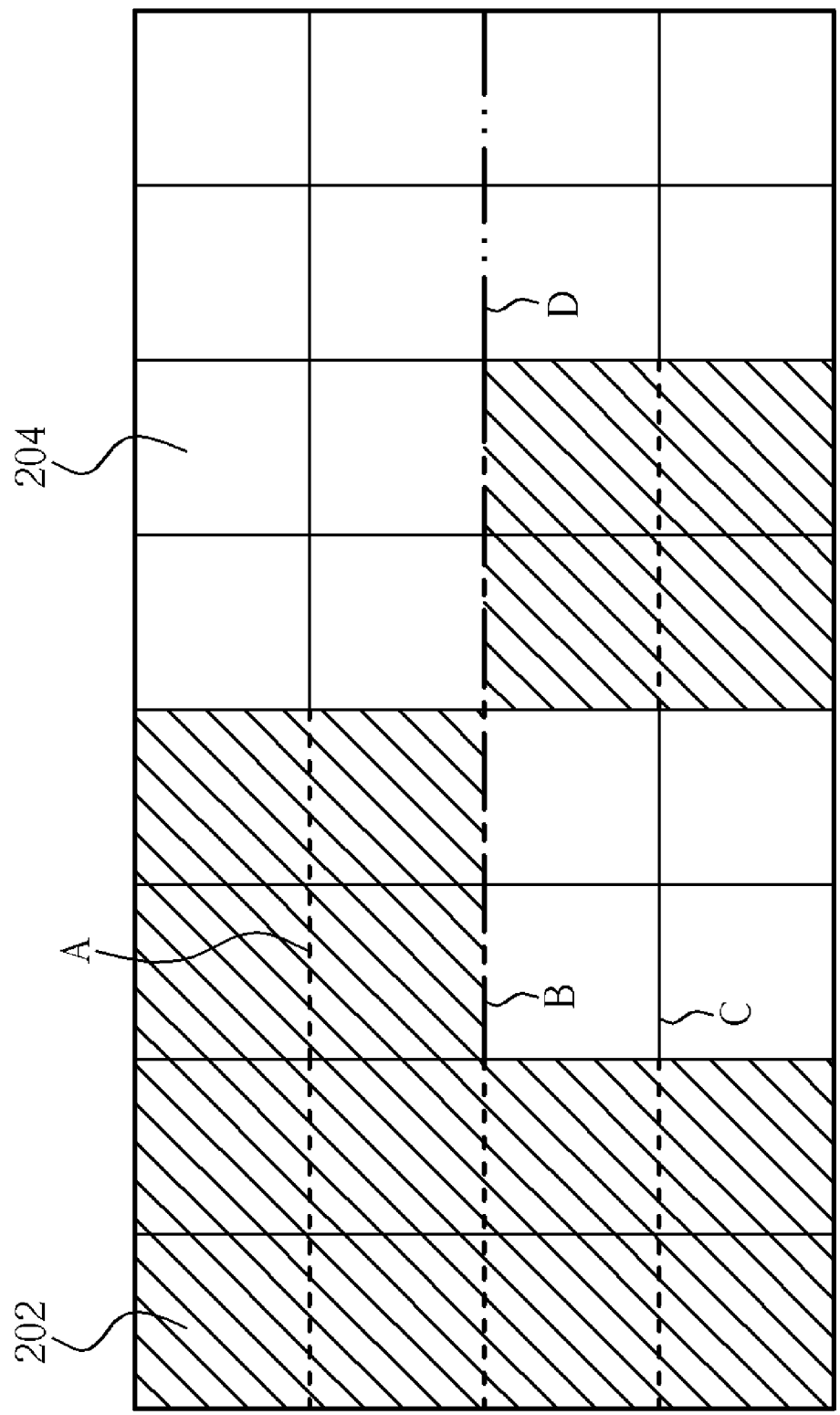
FIG. 5 shows possible mark types of a boundary between two adjacent macro blocks and possible mark types of a boundary between two adjacent blocks of a macro block.

Please refer to FIG. 5. FIG. 5 shows possible mark types of a boundary between two adjacent macro blocks and possible mark types of a boundary between two adjacent blocks of a macro block. A macro block can be coded with either frame DCT or field DCT. The frame based DCT macro blocks 202 are illustrated with hash lines. The field based DCT macro blocks 204 are illustrated without hash lines. The mark type between two adjacent macro blocks or two adjacent blocks of a macro block can be of one of following four types:

Type A: generated between two adjacent macro blocks when both of the macro blocks are coded with frame DCT, and generated between two adjacent blocks of a macro block when the macro block is coded with frame DCT.

Type B: generated between two adjacent macro blocks when one of the macro blocks is coded with frame DCT and the other one is coded with field DCT.

Type C: no mark will be generated at the boundary of two adjacent blocks of a macro block coded with field DCT.

Type D: generated when both of the two adjacent macro blocks are coded with field DCT.

Different types of DCT operation will cause different types of boundary marks between adjacent blocks. Thus the de-blocking method of the boundary between two adjacent blocks should be determined according to the type of DCT operated on the blocks, so as to optimize the de-blocked image quality.

Figure 6:
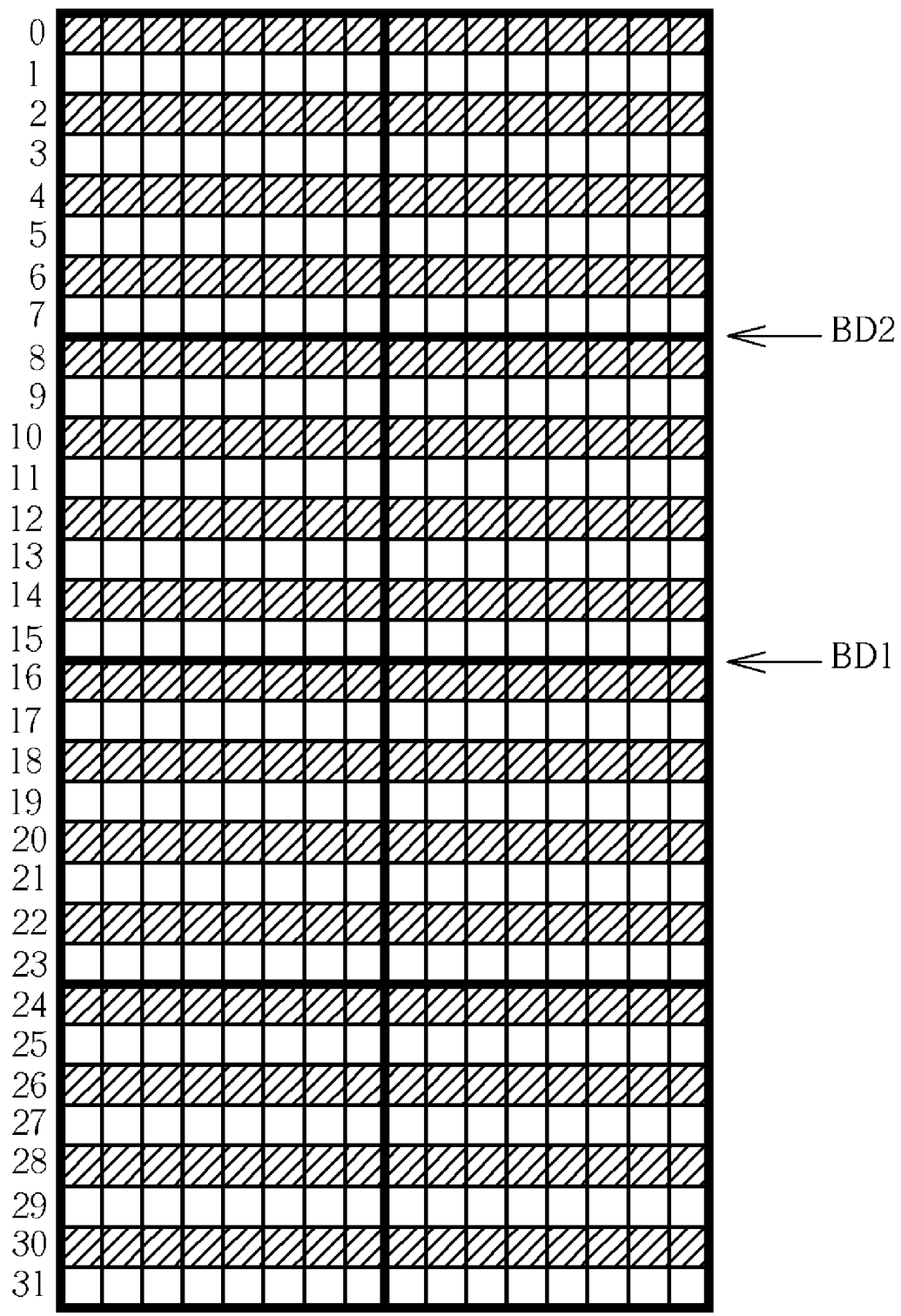
FIG. 6 shows a process for de-blocking the boundary with a mark of type A.

Please refer to FIG. 6. FIG. 6 shows a process for de-blocking the boundary with a mark of type A. When two adjacent macro blocks are coded with frame DCT, the filter techniques can be either de-blocking with 4+4 pixels or de-blocking with 2+2 pixels. In the first method, the format of the image data is of progressive frame pictures. The de-blocking of the horizontal boundary BD1 of the adjacent macro blocks is performed with eight pixels per column closest to the horizontal boundary BD1. Thus the pixels at rows 12 to 15 which are above the boundary BD1 and the pixels at rows 16 to 19 which are below the boundary BD1 are used to perform the de-blocking. Moreover, the de-blocking of the horizontal boundary BD2 of the adjacent blocks of a macro block coded with frame DCT is also performed with eight pixels per column closest to the horizontal boundary BD2. Thus the pixels at rows 4 to 7 which are above the boundary BD2 and the pixels at rows 8 to 11 which are below the boundary BD2 are used to perform the de-blocking. This is called de-blocking with 4+4 pixels. The other method, the format of the image data is of interlaced frame pictures. The de-blocking of the horizontal boundary BD1 of the adjacent macro blocks is performed with four odd pixels per column closest to the horizontal boundary BD1 and four even pixels per column closest to the horizontal boundary BD1. Thus the pixels at even rows 12, 14 and odd rows 13, 15 which are above the boundary BD1 and the pixels at even rows 16, 18 and odd rows 17, 19 which are below the boundary BD1 are used to perform the de-blocking. Moreover, the de-blocking of the horizontal boundary BD2 of the adjacent blocks of a macro block coded with frame DCT is also performed with four odd pixels per column closest to the horizontal boundary BD2 and four even pixels per column closest to the horizontal boundary BD2. Thus the pixels at even rows 0, 2 and odd rows 1, 3 which are above the boundary BD2 and the pixels at even rows 8, 10 and odd rows 9, 11 which are below the boundary BD2 are used to perform the de-blocking. This is called de-blocking with 2+2 pixels.

Figure 7:
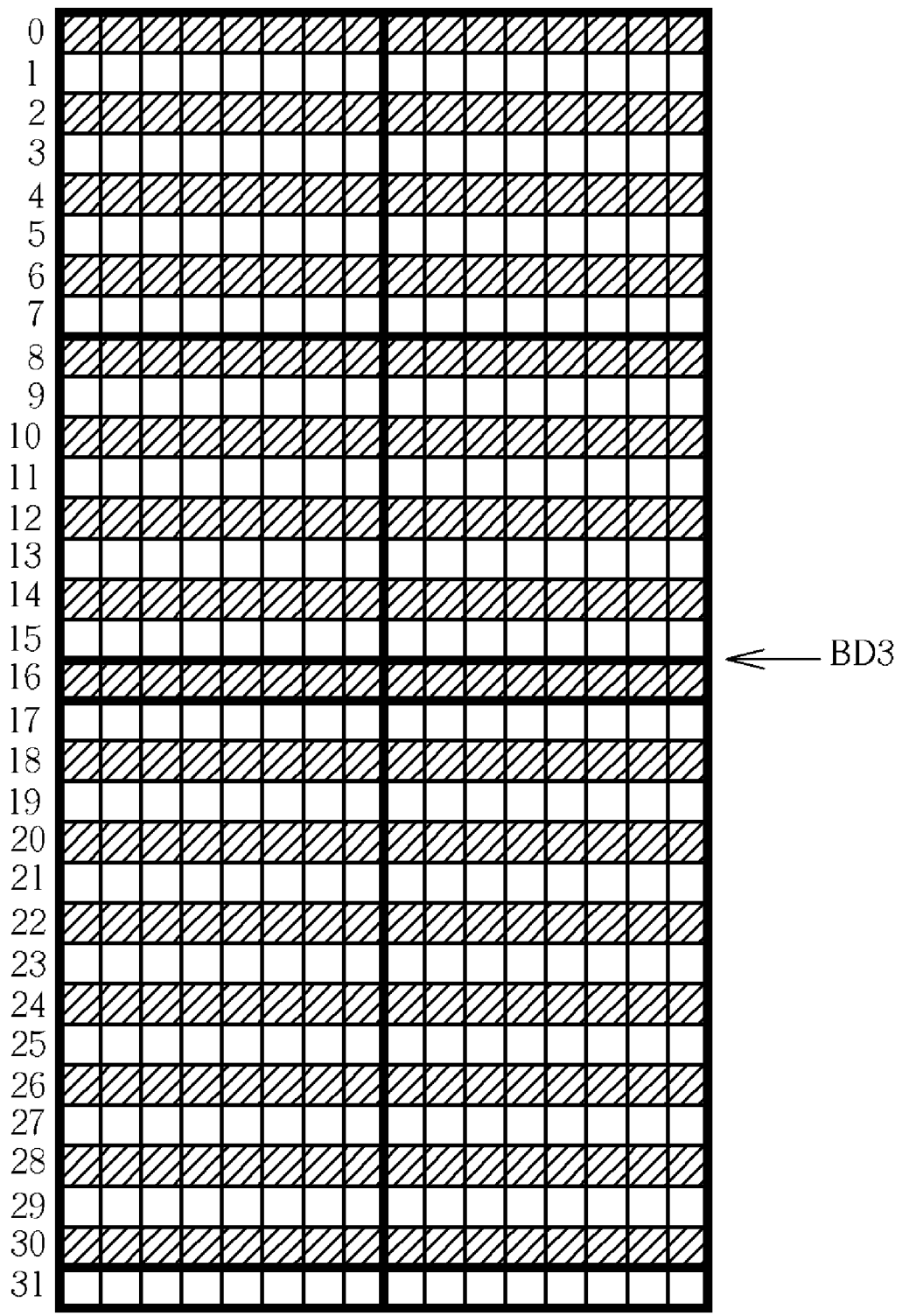
FIG. 7 shows a process for de-blocking the boundary with a mark of type B.

Please refer to FIG. 7. FIG. 7 shows a process for de-blocking the boundary with a mark of type B. When one of two adjacent macro blocks is coded with frame DCT, and the other one is coded with field DCT, the de-blocking of the horizontal boundary BD3 of the adjacent macro blocks is performed with four odd pixels per column closest to the horizontal boundary BD3 and four even pixels per column closest to the horizontal boundary BD3. Thus the pixels at even rows 12, 14 and odd rows 13, 15 which are above the boundary and the pixels at even rows 16, 18 and odd rows 17, 19 which are below the boundary are used to perform the de-blocking. This is called de-blocking with 2+2 pixels.

Figure 8:
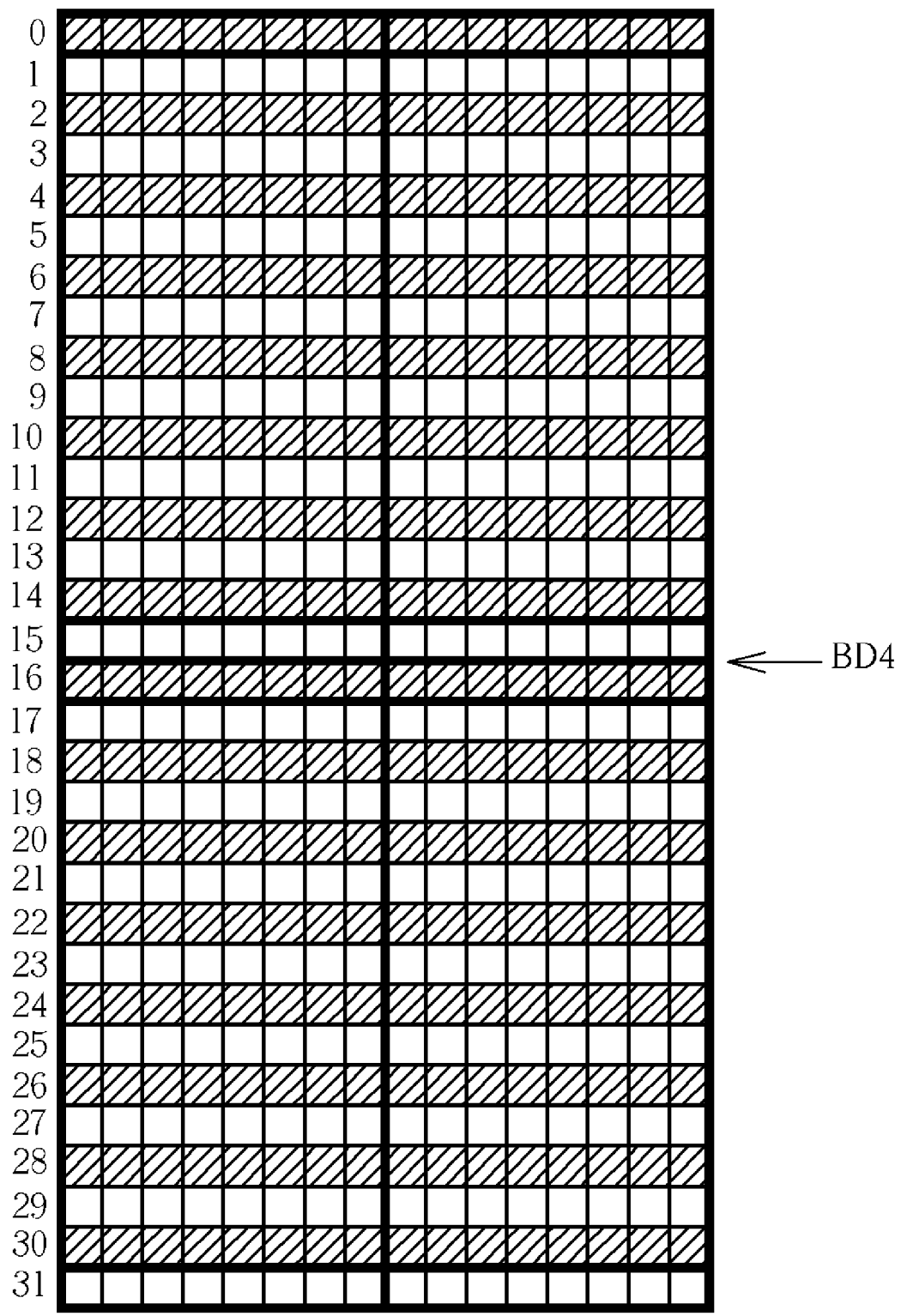
FIG. 8 shows a process for de-blocking the boundary with a mark of type D.

Please refer to FIG. 8. FIG. 8 shows a process for de-blocking the boundary with a mark of type D. When two adjacent macro blocks are coded with field DCT, the de-blocking of the horizontal boundary BD4 of the adjacent macro blocks is performed with four odd pixels per column closest to the horizontal boundary BD4 and four even pixels per column closest to the horizontal boundary BD4. Thus the pixels at even rows 12, 14 and odd rows 13, 15 which are above the boundary and the pixels at even rows 16, 18 and odd rows 17, 19 which are below the boundary are used to perform the de-blocking. This is called de-blocking with 2+2 pixels.

Figure 9:
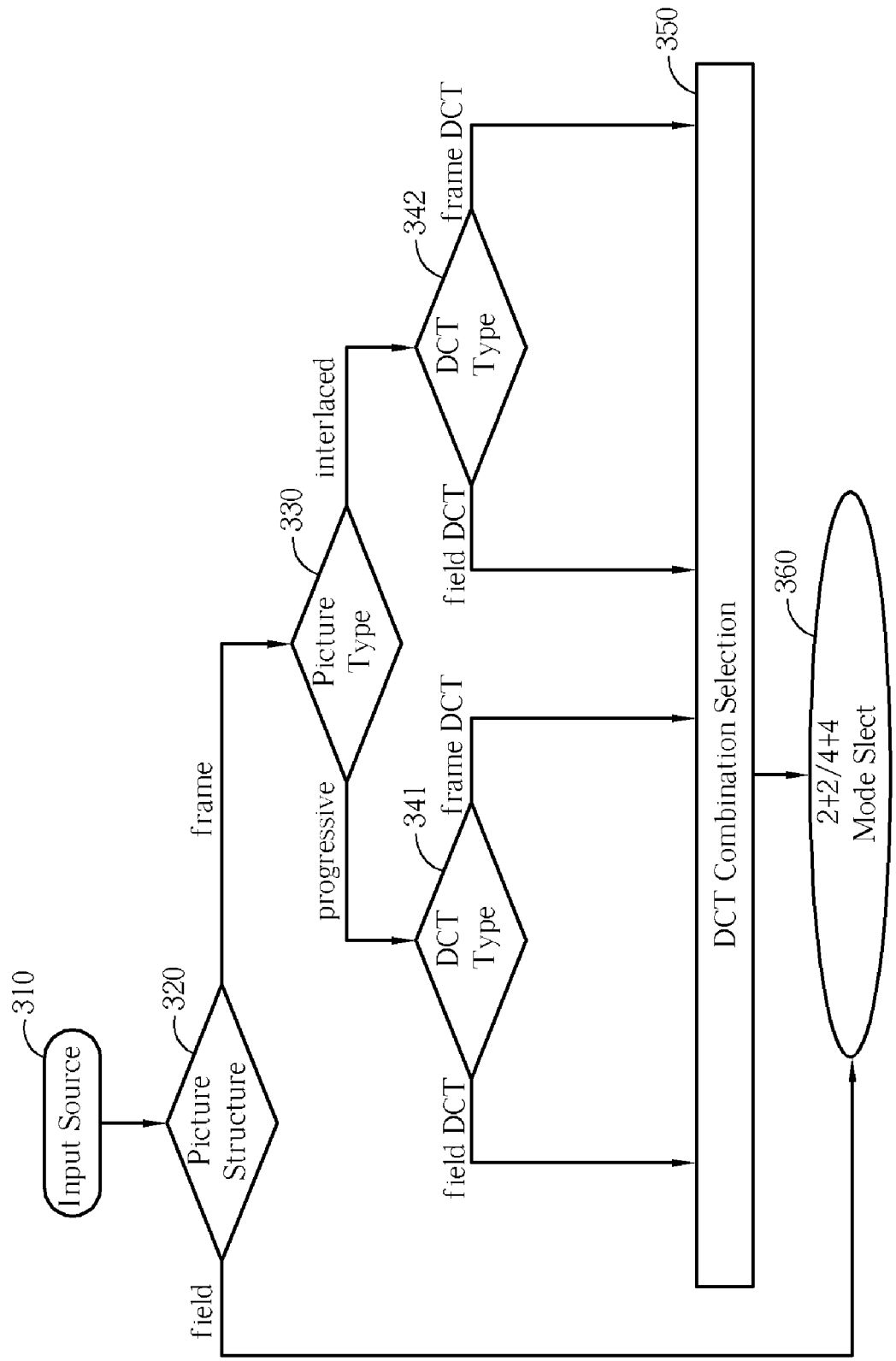
FIG. 9 is a flowchart of determining a de-blocking method of a horizontal boundary between two adjacent blocks of a macro block or a horizontal boundary between two adjacent macro blocks.

Please refer to FIG. 9. FIG. 9 is a flowchart of determining a de-blocking method of a horizontal boundary between two adjacent blocks of a macro block or a horizontal boundary between two adjacent macro blocks. The process comprises the following steps:

Step 310: input image data;

Step 320: check the picture structure of the image data, if the picture structure is of field pictures, go to step 360; if the picture structure is of frame pictures, go to step 330;

Step 330: check the picture type of the image data, if the picture type is of progressive pictures, go to step 341; if the picture type is of interlaced pictures, go to step 342;

Step 341: check if the coding type of a macro block is frame DCT or field DCT;

Step 342: check if the coding type of a macro block is frame DCT or field DCT;

Step 350: determine the mark type of the boundary of blocks or macro blocks according to the format of image data and the coding type of the macro blocks;

Step 360: determine if the de-blocking should be with 2+2 pixels or 4+4 pixels.

Please refer to FIGS. 10 and 11. FIG. 10 is a table for de-blocking a horizontal boundary between two adjacent blocks of a macro block. FIG. 11 is a table for de-blocking a horizontal boundary between two adjacent macro blocks. As shown in FIG. 10, when the format of the image data is of progressive frame pictures and when the coding type of the macro block is frame DCT, de-blocking the horizontal boundary of adjacent blocks of the macro block with eight pixels per column closest to the horizontal boundary. When the format of the image data is of interlaced frame pictures and when the coding type of the macro block is frame DCT, de-blocking the horizontal boundary of adjacent blocks of the macro block with four odd pixels per column closest to the horizontal boundary and four even pixels per column closest to the horizontal boundary. When the format of the image data is of interlaced field pictures, de-blocking the horizontal boundary of adjacent blocks of the macro block with eight odd pixels per column closest to the horizontal boundary and eight even pixels per column closest to the horizontal boundary. As shown in FIG. 11, when the format of the image data is of progressive frame pictures and when the coding type of the adjacent macro blocks is frame DCT, de-blocking the horizontal boundary of adjacent macro blocks with eight pixels per column closest to the horizontal boundary. When the format of the image data is of progressive frame pictures and when the coding type of the adjacent macro blocks is field DCT, de-blocking the horizontal boundary of adjacent macro blocks with four odd pixels per column closest to the horizontal boundary and four even pixels per column closest to the horizontal boundary. When the format of the image data is of interlaced frame pictures, de-blocking the horizontal boundary of adjacent macro blocks with four odd pixels per column closest to the horizontal boundary and four even pixels per column closest to the horizontal boundary. When the format of the image data is of interlaced field pictures, de-blocking the horizontal boundary of adjacent macro blocks with eight odd pixels per column closest to the horizontal boundary and eight even pixels per column closest to the horizontal boundary. When the format of the image data is of frame pictures and when the coding type of the adjacent macro blocks one with frame DCT and the other with field DCT, de-blocking a horizontal boundary of the adjacent macro blocks with four odd pixels per column closest to the horizontal boundary and four even pixels per column closest to the horizontal boundary.

In conclusion, image data is initially sampled block by block and then followed by a DCT operation. Each block has 8×8 pixels. DCT operation is performed on a macro block of four blocks. The image data are coded with field DCT or frame DCT depending on the characteristics of the image data. However different coding types will result in different boundary marks of boundaries between adjacent blocks or adjacent macro blocks. Therefore the de-blocking of a boundary between two adjacent blocks or adjacent macro blocks should be performed according to the format of image data and the coding type of the adjacent blocks or adjacent macro blocks.

Those skilled in the art will readily observe that numerous modifications and alterations of the device and method may be made while retaining the teachings of the invention.

What is claimed is:

1. A method for processing a macro block of image data comprising:
    coding the macro block with frame discrete cosine transform (frame DCT) or field discrete cosine transform (field DCT); and
    de-blocking a horizontal boundary of adjacent blocks of the macro block with four odd pixels per column closest to the horizontal boundary and four even pixels per column closest to the horizontal boundary when the format of the image data is of interlaced frame pictures and when the coding type of the macro block is frame DCT.

2. The method of claim 1 wherein de-blocking the horizontal boundary of adjacent blocks of the macro block according to the format of the image data and the coding type of the macro block is when the format of the image data is of progressive frame pictures and when the coding type of the macro block is frame DCT, de-blocking the horizontal boundary of adjacent blocks of the macro block with eight pixels per column closest to the horizontal boundary.

3. The method of claim 1 wherein de-blocking the horizontal boundary of adjacent blocks of the macro block according to the format of the image data and the coding type of the macro block is when the format of the image data is of interlaced field pictures, de-blocking the horizontal boundary of adjacent blocks of the macro block with eight odd pixels per column closest to the horizontal boundary and eight even pixels per column closest to the horizontal boundary.

4. A method for processing adjacent macro blocks of image data comprising:
    coding the adjacent macro blocks with frame discrete cosine transform (frame DCT) or field discrete cosine transform (field DCT); and
    de-blocking a horizontal boundary of the adjacent macro blocks with four odd pixels per column closest to the horizontal boundary and four even pixels per column closest to the horizontal boundary when the format of the image data is of interlaced frame pictures.

5. The method of claim 4 wherein de-blocking the horizontal boundary of the adjacent macro blocks according to the format of the image data and the coding type of the adjacent macro blocks is when the format of the image data is of progressive frame pictures and when the coding type of the adjacent macro blocks is frame DCT, de-blocking the horizontal boundary of adjacent macro blocks with eight pixels per column closest to the horizontal boundary.

6. The method of claim 4 wherein de-blocking the horizontal boundary of the adjacent macro blocks according to the format of the image data and the coding type of the adjacent macro blocks is when the format of the image data is of progressive frame pictures and when the coding type of the adjacent macro blocks is field DCT, de-blocking the horizontal boundary of adjacent macro blocks with four odd pixels per column closest to the horizontal boundary and four even pixels per column closest to the horizontal boundary.

7. The method of claim 4 wherein de-blocking the horizontal boundary of the adjacent macro blocks according to the format of the image data and the coding type of the adjacent macro blocks is when the format of the image data is of interlaced field pictures, de-blocking the horizontal boundary of adjacent macro blocks with eight odd pixels per column closest to the horizontal boundary and eight even pixels per column closest to the horizontal boundary.

* * * * *